(12) United States Patent
Ruml et al.

(10) Patent No.: US 7,925,366 B2
(45) Date of Patent: Apr. 12, 2011

(54) SYSTEM AND METHOD FOR REAL-TIME SYSTEM CONTROL USING PRECOMPUTED PLANS

(75) Inventors: Wheeler Ruml, Palo Alto, CA (US);
Minh Binh Do, Mountain View, CA (US); Rong Zhou, San Jose, CA (US); Haitham Ali Hindi, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 495 days.

(21) Appl. No.: 11/807,475

(22) Filed: May 29, 2007

(65) Prior Publication Data
US 2008/0300706 A1    Dec. 4, 2008

(51) Int. Cl.
*G06F 19/00* (2011.01)
*G06F 17/30* (2006.01)

(52) U.S. Cl. .............. 700/101; 707/2; 399/341
(58) Field of Classification Search ............ 700/99–101; 358/1.12, 1.13, 1.15, 406; 399/341, 364; 707/1–3
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A * | 4/1996 | Saraswat et al. | 399/364 |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,389 A * | 1/1997 | Dumas et al. | 399/16 |
| 5,596,416 A | 1/1997 | Barry et al. | |
| 5,629,762 A | 5/1997 | Mahoney et al. | |
| 5,710,968 A | 1/1998 | Clark et al. | |
| 5,778,377 A | 7/1998 | Marlin et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — Ramesh B Patel
*Assistant Examiner* — Douglas S Lee
(74) *Attorney, Agent, or Firm* — Fay Sharpe LLP

(57) ABSTRACT

Features described herein relate to optimizing a job plan procedure for selecting a plan for executing a manufacturing job. A planner can receive a model of a system that is to perform a job, and may select a precomputed plan that is sufficient to perform the job. The precomputed plan is identified during a first portion of a planning period, and the remainder of the planning period may be utilized to search for and identify a better plan for executing the job. If a better plan cannot be identified by the end of the planning period, then the selected precomputed plan can be executed.

24 Claims, 11 Drawing Sheets

U.S. PATENT DOCUMENTS

| | | | |
|---|---|---|---|
| 5,884,910 A | 3/1999 | Mandel | |
| 5,995,721 A | 11/1999 | Rourke et al. | |
| 6,059,284 A | 5/2000 | Wolf et al. | |
| 6,125,248 A | 9/2000 | Moser | |
| 6,241,242 B1 | 6/2001 | Munro | |
| 6,297,886 B1 | 10/2001 | Cornell | |
| 6,317,774 B1 | 11/2001 | Jones et al. | |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,606,527 B2* | 8/2003 | de Andrade et al. | 700/97 |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 7,024,152 B2 | 4/2006 | Lofthus et al. | |
| 7,123,873 B2 | 10/2006 | deJong et al. | |
| 7,162,172 B2 | 1/2007 | Grace et al. | |
| 7,188,929 B2 | 3/2007 | Lofthus | |
| 7,206,532 B2 | 4/2007 | Lofthus et al. | |
| 7,206,536 B2 | 4/2007 | Julien | |
| 7,233,405 B2* | 6/2007 | Fromherz | 358/1.13 |
| 7,233,939 B1* | 6/2007 | Ziauddin | 707/2 |
| 2002/0078012 A1 | 6/2002 | Ryan et al. | |
| 2002/0103559 A1 | 8/2002 | Gartstein | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0278303 A1* | 12/2005 | Ruml et al. | 707/3 |
| 2006/0066885 A1 | 3/2006 | Anderson et al. | |
| 2006/0067756 A1 | 3/2006 | Anderson et al. | |
| 2006/0067757 A1* | 3/2006 | Anderson et al. | 399/341 |
| 2006/0114313 A1 | 6/2006 | Moore | |
| 2006/0114497 A1 | 6/2006 | Anderson et al. | |
| 2006/0115287 A1 | 6/2006 | Roof | |
| 2006/0115288 A1 | 6/2006 | Roof | |
| 2006/0132815 A1 | 6/2006 | Lofthus et al. | |
| 2006/0176336 A1 | 8/2006 | Moore et al. | |
| 2006/0197966 A1 | 9/2006 | Viturro et al. | |
| 2006/0209101 A1 | 9/2006 | Mizes | |
| 2006/0214359 A1 | 9/2006 | Clark | |
| 2006/0214364 A1 | 9/2006 | Clark et al. | |
| 2006/0215240 A1 | 9/2006 | Mongeon | |
| 2006/0221159 A1 | 10/2006 | Moore et al. | |
| 2006/0221362 A1 | 10/2006 | Julien et al. | |
| 2006/0222384 A1 | 10/2006 | Moore et al. | |
| 2006/0222393 A1 | 10/2006 | de Jong et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0233569 A1 | 10/2006 | Furst et al. | |
| 2006/0235547 A1 | 10/2006 | Hindi et al. | |
| 2006/0238778 A1 | 10/2006 | Mongeon et al. | |
| 2006/0244980 A1 | 11/2006 | Grace | |
| 2006/0250636 A1* | 11/2006 | Richards | 358/1.15 |
| 2006/0268317 A1 | 11/2006 | Lofthus et al. | |
| 2006/0268318 A1 | 11/2006 | Lofthus et al. | |
| 2006/0269310 A1 | 11/2006 | German et al. | |
| 2006/0274334 A1 | 12/2006 | Mongeon | |
| 2006/0274337 A1 | 12/2006 | Dalal et al. | |
| 2006/0280517 A1 | 12/2006 | Roof et al. | |
| 2006/0285159 A1 | 12/2006 | Frankel | |
| 2006/0285857 A1 | 12/2006 | Swift | |
| 2007/0002085 A1 | 1/2007 | Sampath et al. | |
| 2007/0002344 A1 | 1/2007 | Klassen | |
| 2007/0002403 A1 | 1/2007 | Klassen | |
| 2007/0024894 A1 | 2/2007 | Moore et al. | |
| 2007/0031170 A1 | 2/2007 | deJong et al. | |
| 2007/0041745 A1 | 2/2007 | Dalal et al. | |
| 2007/0052991 A1 | 3/2007 | Goodman et al. | |
| 2007/0081064 A1 | 4/2007 | Spencer et al. | |
| 2007/0081828 A1 | 4/2007 | Radulski et al. | |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.

U.S. Appl. No. 11/639,073, filed Dec. 14, 2006, Biegelsen et al.
U.S. Appl. No. 11/643,119, filed Dec. 21, 2006, Clark et al.
U.S. Appl. No. 11/656,992, filed Jan. 23, 2007, Sampath et al.
U.S. Appl. No. 11/708,298, filed Feb. 20, 2007, Lang.
U.S. Appl. No. 11/714,016, filed Mar. 5, 2007, Furst.
EPO European Search Report, Application No. WO 08 15 7086.3, Completed Nov. 14, 2008.
Ladislau Boloni et al., "Robust scheduling of metaprograms," Purdue University, XP-002503992, Sep. 29, 1998, pp. 1-16.

Zhiao Shi, "Scheduling Tasks with Precedence Constraints on Heterogenous Distributed Computing Systems," University of Tennessee, Dissertation, XP-002503993, Dec. 2006, pp. 42-46.
Jeffrey Shneidman et al., "A Cost-Space Approach to Distributed Query Optimization in Stream Based Overlays," Data Engineering Workshops, 2005, 21st International Conference on Tokyo, Japan, Apr. 5-8, 2005, Piscataway, NJ, USA, IEEE, Apr. 5, 2005, pp. 1182-1187, XP-010924084.

* cited by examiner

SYSTEM AND METHOD FOR REAL-TIME SYSTEM CONTROL USING PRECOMPUTED PLANS

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Publication No. US-2006-0132815-A1, Published Jun. 22, 2006, entitled "PRINTING SYSTEMS," by Robert M. Lofthus, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/359,065, filed Feb. 22, 2005, entitled "MULTI-MARKING ENGINE PRINTING PLATFORM", by Martin E. Banton;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.

BACKGROUND

Various features described herein relate generally to a tightly-integrated parallel printing architecture and more specifically to print job plan optimization.

As printing machines and related components become more complex, a need arises for systems and methods that facilitate processing numerous commands and ever-more-copious amounts of information. On the other hand, as processor speed increases and memory capacity grows, print platforms become increasingly complex in order to fully exploit the processing power of modern computing systems. The trends of increasing processing power to meet system demands and then increasing system functionality to maximize utilization of available processing power combine to cause a marked increase in the complexity of printing systems.

Conventional planning algorithms attempt to generate a planned ordering or sequence of events for processing a print job received at a printer. When multiple printing options are involved in a print job, careful routing of a sequence of pages to be printed through a printer can become crucial. For instance, print job planning can facilitate conserving resources such as toner and paper while improving throughput of a printing platform.

In model-based planning, especially for online planning for manufacturing systems such as printers, the speed of the planner is critical. A conventional online planner constructs plans from scratch incrementally when a new job request is received. This allows for the exploration of all possibilities and finds good quality and even optimal plans. However, this approach can lead to a lengthy planning time when the system is complex. Accordingly, a need exists for systems and/or methods that facilitate quickly locating a job plan for executing a received job, as well as performing additional search for an optimal-quality plan, within predefined time bound.

BRIEF DESCRIPTION

A method of planning a job in a machine environment comprises receiving a job to be planned, analyzing a set of precomputed plans to identify a first plan that is feasible, and scheduling the first plan as a default plan. The method further comprises setting a maximum planning time period to identify a second plan, identifying the second plan if available, and determining whether the second plan is better than the first plan.

A system for performing offline and online job planning for a machine job comprises a constraint library that stores at least one constraint that is employed to ensure that a given job plan conforms to a job request, and a planner that analyzes a precomputed plan database and identifies a first plan to satisfy the job request during a first portion of a predefined planning period, and attempts to identify a second plan during a second portion of the predefined planning period. The system further comprises an optimizer that compares the first plan and the second plan to determine which plan is better for executing the job request.

BRIEF DESCRIPTION OF THE DRAWINGS

FIG. 3 illustrates a network-flow model solution for a media routing job in a machine, such as a TIPP platform or the like.

FIG. 4 illustrates a model-based online planner solution for a media routing job in a machine, such as a TIPP platform or the like.

DETAILED DESCRIPTION

Various features described herein relate to an approach for reducing planning time by intelligently using a set of precomputed plans to quickly select a solution to a given job. A planner may then use the rest of the allotted planning time to improve on the initially selected solution. An advantage of this approach compared to the current practice is the ability to find a valid plan very quickly. Thus, in systems that demand fast planning, such as multiple-IME printers, the approach can provide performance guarantee in scenarios where real-time constraints make it difficult for a conventional planner to find an optimal plan that can achieve the maximum productivity of the system in a reasonable time frame.

Figure 1:
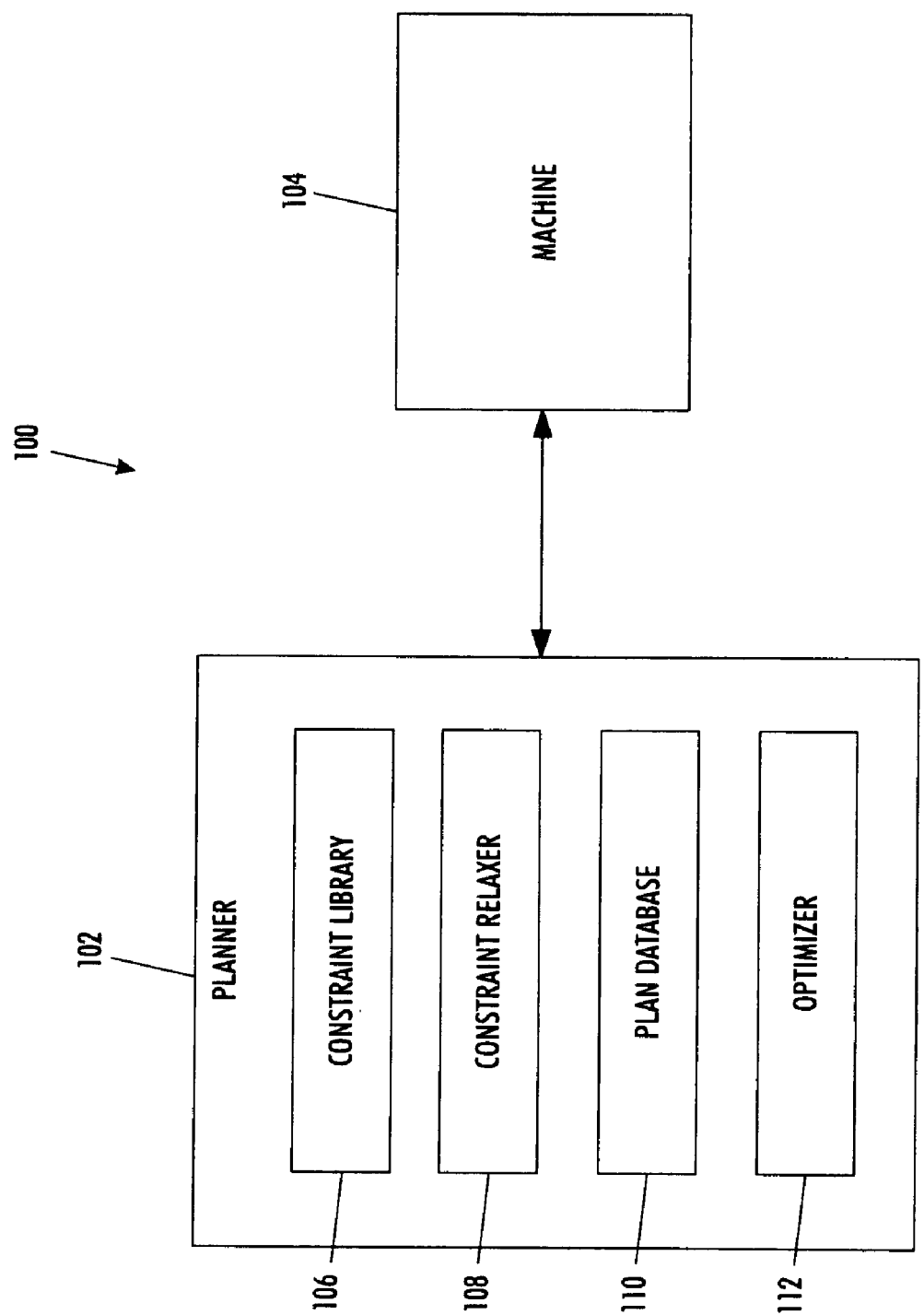
FIG. 1 illustrates a system that comprises a planner that is operatively coupled to a machine, and which may plan jobs for the machine.

With reference to FIG. 1, a system 100 comprises a planner 102 that is operatively coupled to a machine 104, and which may plan jobs for the machine 104. For example, the machine may be a router in a manufacturing environment and may route objects from one manufacturing device to another. In such a scenario, the planner 102 may determine an optimal plan or schedule for movement of an object to and from various devices within the manufacturing environment. According to another example, the machine 104 may be a printer, and the planner 102 may facilitate optimizing execution of a print job or the like by finding an optimal way to route sheets of paper from one component to another.

The planner 102 comprises a constraint library 106 that stores information related to one or more constraints that may be applied when constructing and/or selecting a plan for a received task or job. For example, a temporal constraint may be associated with a job solution, such as a predetermined maximum time period in which the job is to be completed, or a predetermined maximum time period for identifying or selecting a job solution, etc. As another example, a constraint may relate to ensuring that an optimal solution is selected, such as a constraint that indicates a preference for a job solution that utilizes a smallest number of components to complete the job. In another example the constraint library comprises constraints related to the discreteness of objects to be scheduled and/or interactions between different activities of different objects. In still other examples, the library comprises constraints that relate to interferences between different operators in the system, and/or to interferences between different objects moving in the system. The constraint library 106 may comprise constraints such as the foregoing and any other suitable or desirable constraints, such as will be appreciated by those of skill.

The planner 102 further comprises a constraint relaxer 108 that selectively relaxes and/or removes one or more constraints applied when generating and/or selecting a job solution, or plan, in order to make it easier to find a plan quickly by increasing the number of plans that may be generated or identified for a given job. For instance, by relaxing one or more constraints on a job plan criterion, constraint relaxer 108 can increase a number of job plans that are identified as acceptable for job execution, thereby increasing a number of options available. As a consequence, make it easier to find a satisfying or optimal plan (subject to the relaxed set of constraints). As an example, a temporal constraint may dictate that a preferred job plan has an execution time not greater than 10 seconds, and an ordering constraint may dictate that events a, b, and c are performed in consecutive order. In a case where six possible job solutions can be executed in 10 seconds or fewer, but only one solution performs events a, b, and c in the desired order, then constraint relaxer 108 may relax the ordering constraint to permit, for instance, events b and c to occur in any order so long as event a occurs first, which may result in a higher number of satisfactory job solutions. As a related example, constraint relaxer 108 may completely remove the ordering constraint to make all six job plans available for selection and/or execution.

A plan database 110 can store one or more job plans, or solutions, which may be pre-computed or may be generated upon receiving a job or task. The plan database 110 can store information related to one or more selected plans, identified as meeting all criteria and/or constraints associated with a given job, and/or any other information related to job planning and/or execution. Additionally, the planner 102 comprises an optimizer 112 that identifies an optimal plan in a set of one or more plans that meet given constraints. According to an example wherein the machine 104 is a printer or other xerographic machine, the optimizer 112 can determine that a plan with a shortest execution time is desirable over plans that take longer to perform, while conservation of a particular resource, such as paper or toner, is less important given a particular set of conditions (e.g., a job queue is full or almost full, etc.). In such a case, the optimizer 112 may instruct the constraint relaxer 108 to relax or remove a constraint that requires a minimal usage of toner, which in turn may permit job plans with shortest execution time to be identified, analyzed, selected, etc., in less time.

According to other examples, when a model of the machine 104 or, for instance, a manufacturing plant is provided to the planner 102, the planner 102 can use the model to compute possible "routes" (e.g., of an object through the manufacturing plant, a machine, a printer, etc.), or job plans, that optimize the overall throughput of the plant or the machine 104. While doing so, the planner 102, via the constraint relaxer 108, can relax certain constraints to reduce job solution selection time. For instance, the planner 102 can use a network flow-based optimizer. The planner 102 can then store the job plans, computed under the relaxed condition, in the plan database 110, and can try to use them first when searching for a plan for a new job. A satisfactory plan can thus be found quickly because a need for a planning search or scheduling search is mitigated. The satisfactory plan can then be used as an upper bound for subsequent planning searches for better plans in the allowed planning time. Thus, system 100 provides a flexible framework that can be used with branch-and-bound, best-first, or any "anytime" search algorithm employed by the planner 102.

Figure 2:
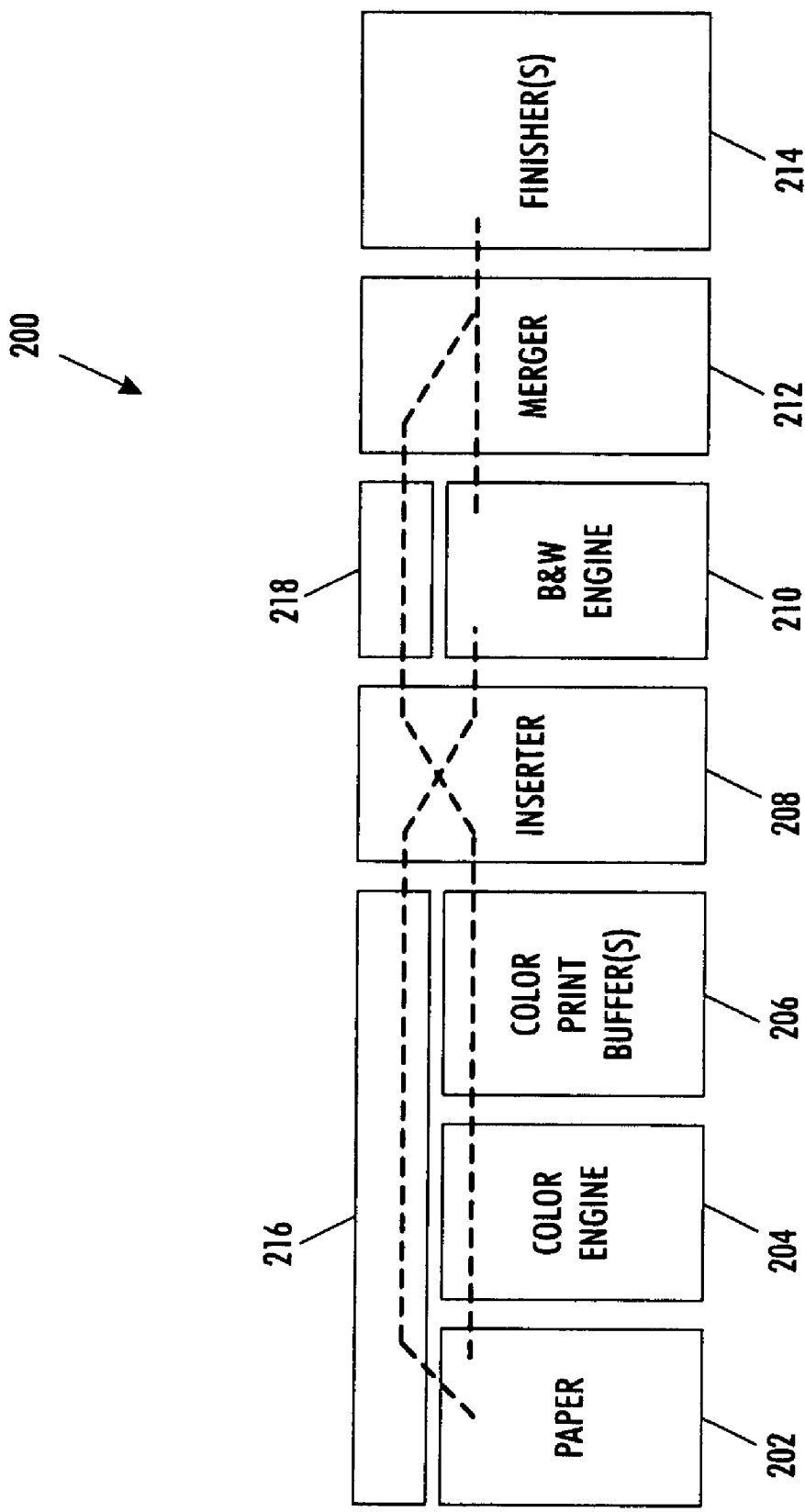
FIG. 2 illustrates a system comprising a plurality of components, such as may be employed in a universal production printer with a color print sheet buffer or a tightly-integrated parallel printer (TIPP) system, which represents an environment in which the various features described herein may be employed.

FIG. 2 illustrates a system 200 comprising a plurality of components, such as may be employed in a universal production printer with a color print sheet buffer or a tightly-integrated parallel printer (TIPP) system, which represents an environment in which the various features described herein may be employed. The system 200 comprises a paper source 202, which may comprise one or more sheets of paper, and which is operatively associated with a color print engine 204 and an inserter 208. Paper from the paper source 202 may follow one of two paths. For instance, paper may be routed from the paper source 202 to the color print engine 204, and on to a color print buffer 206, before entering the inserter 208. Additionally or alternatively, paper may be routed directly from the paper source 202 to the inserter 208 (e.g., bypassing the color engine 204 and the color print buffer 206 using the highway path 216). Similarly, paper may bypass the black and white engine 210 using the highway path 218.

Paper that has been routed directly from the paper source 202 to the inserter 208 may be passed to a black-and-white print engine 210, then through a merger 212 that merges black-and-white and color pages, before proceeding on to a finisher 214 that finishes the document for presentation to a user. It will be appreciated that according to other examples, a page may pass through all components of the system 200 and may have both color portions and black-and-white portions. The actions associated with a job performed by system 200 may be organized into a series of events that define one or more solutions, or "plans," to the job.

Figure 3:
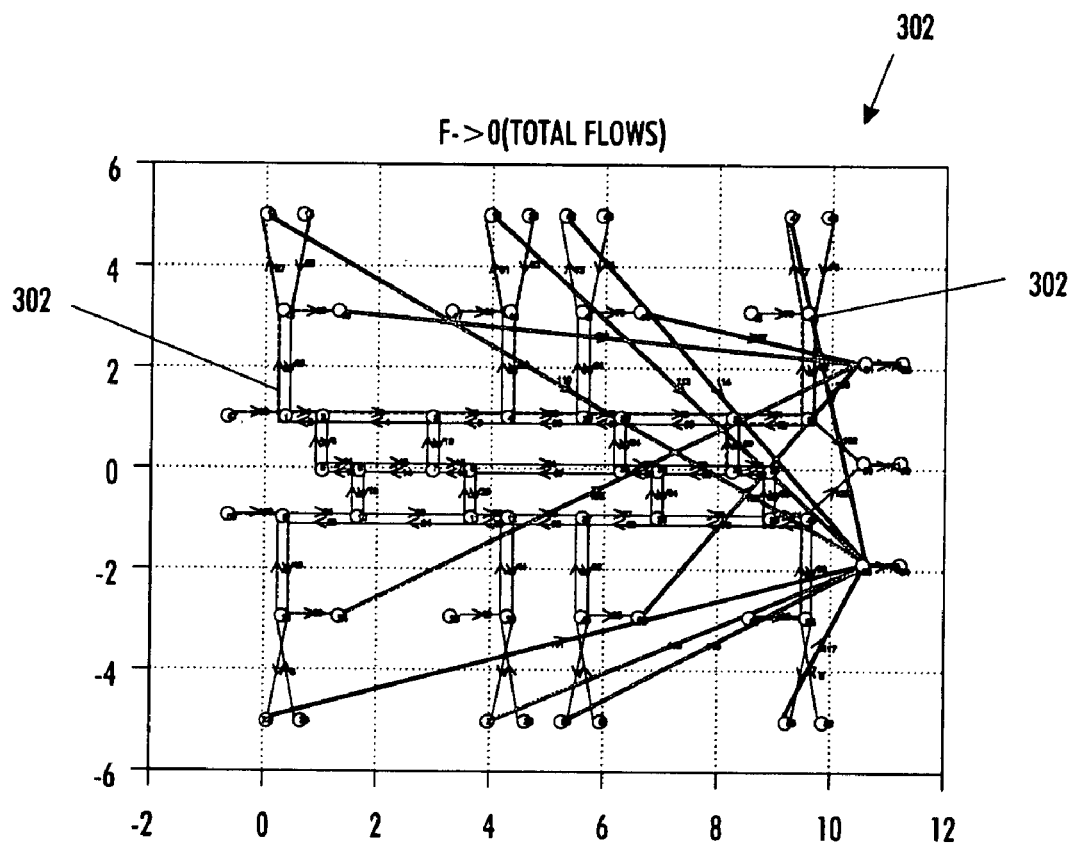

FIG. 3 illustrates a network-flow model solution 300 for a media routing job in a machine, such as a TIPP platform or the like. Given a model, the network-flow model relaxes the constraints that materials in a plant (e.g., sheets of paper in the TIPP printer(s)) are discrete and finds the possible routes in the system that maximize the throughput of the plant under the relaxed condition. The model is "solved" once and need not take into account the real-time constraints of sheets interleaving at different locations in the printer when the printing job is requested. The solution 300 shows a set of potential routes 302 that can achieve a desired throughput for the system.

Figure 4:
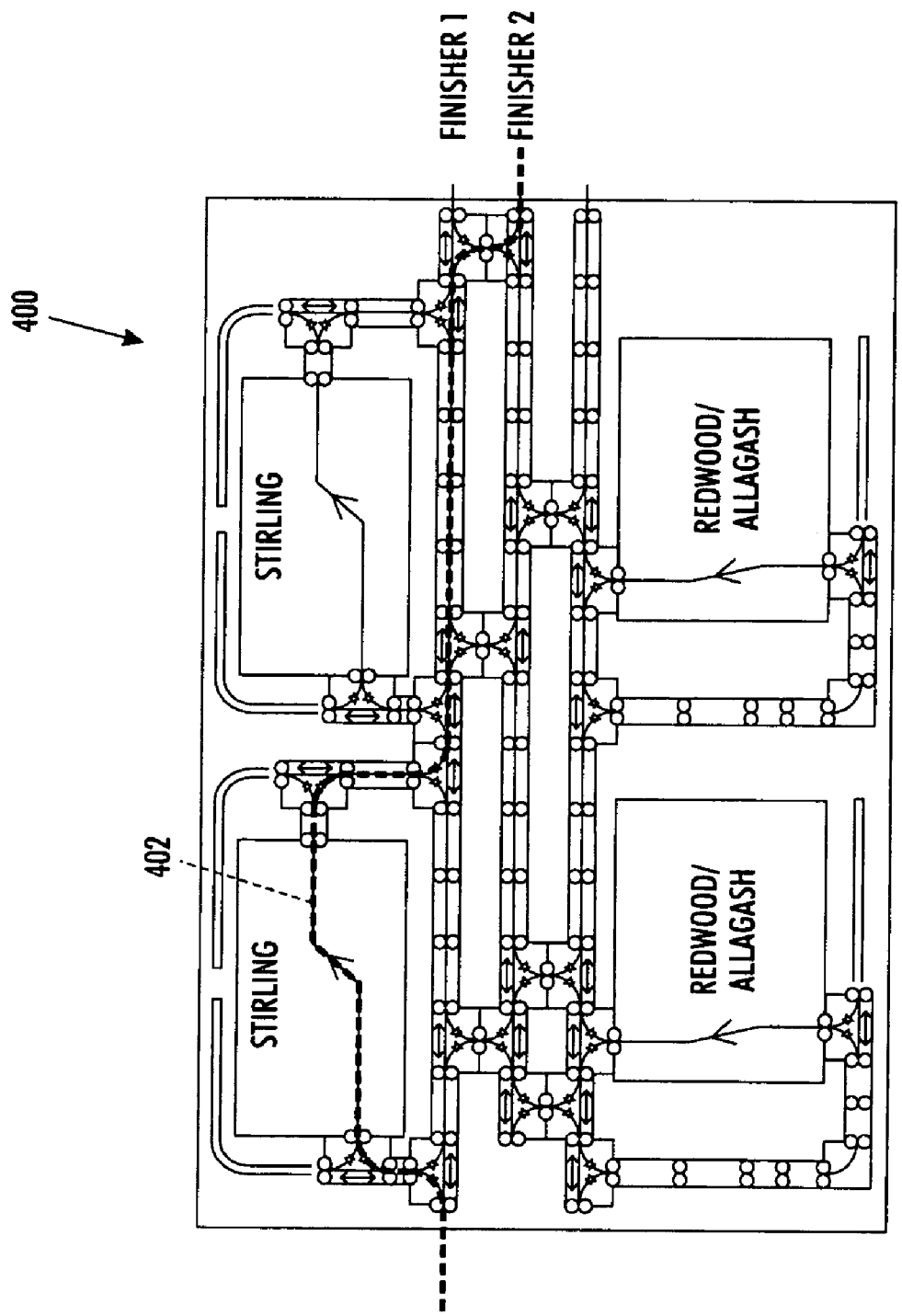

FIG. 4 illustrates a model-based online planner solution 400 for a media routing job in a machine, such as a TIPP platform or the like. A model-based online planner can build a concrete route for a given printing job, such as the route 402 shown in the figure. The route 402 can be built incrementally and takes into account real-time constraints. All possible routes can be examined to ensure the final solution is correct and optimal. For instance, in a printer or the like, starting with an empty route, a given machine capability can be added at each step until a complete route from the input (feeder) to the output (finisher) that goes through necessary modules is completed. If the plan, or route, is built from scratch each time and constraints are not relaxed, the total time to find the solution is difficult to ascertain. However, the solution quality is good if the underlying search algorithm used (e.g. A*) can guarantee optimality.

Figure 5:
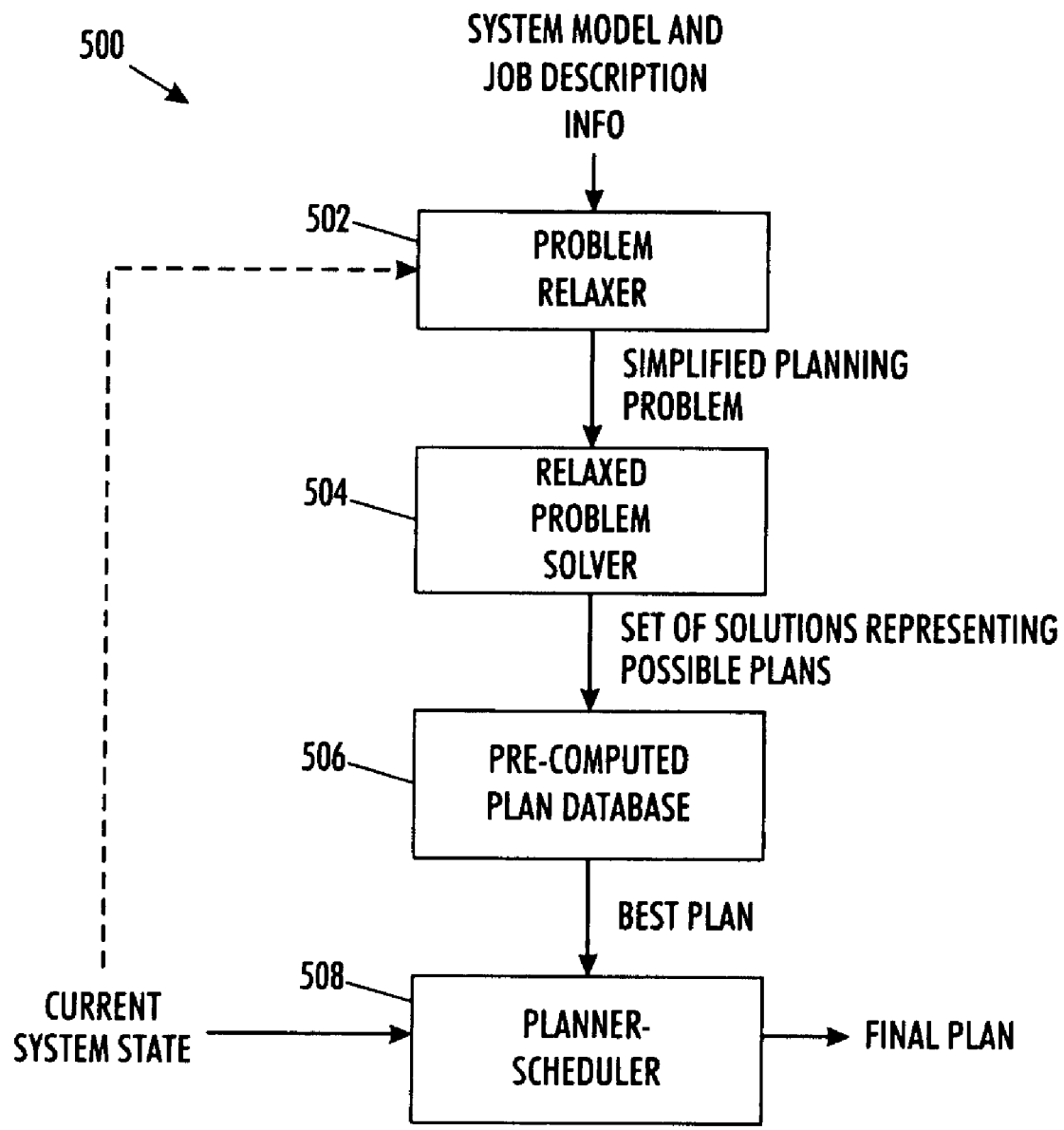
FIG. 5 illustrates a planning framework that facilitates quickly locating a job plan for executing a received job, as well as performing a search for an optimal-quality plan, within predefined time bound.

FIG. 5 illustrates a planning framework 500 that facilitates quickly locating a precomputed job plan for executing a received job, as well as performing a search for an optimal-quality plan, within a predefined time bound. The framework 500 comprises a problem relaxer 502 that receives information associated with a system model, such as a manufacturing plant, assembly line, print platform, etc. The problem relaxer 502 can also receive information related to a job to be performed by the modeled system. Once such information is received, the problem relaxer can relax one or more constraints associated with performance of the job (e.g., job duration limits, specific execution criteria, event orderings, etc.) and can output a simplified, or "relaxed," planning problem. A relaxed problem solver 504 can receive the simplified planning problem and generate one or more solutions that represent respective plans for executing the received job description. The solution(s) can be stored in a precomputed plan database 506 for subsequent access by a planner-scheduler 508.

According to an example, the planner-scheduler 508 can receive information relating to a current state of a system, such as a printer, for which a job plan is desired. The current state information can describe, without being limited to, a level of resource availability, a level at which system resources are taxed, whether the system is busy executing other jobs, whether and/or when the system will be ready to execute the job currently being planned, etc. The planner-scheduler 508 accesses the precomputed plan database 506 and selects a best among plans stored in the database 506 according to the optimization criteria, which may be output as a final plan to the system for execution. In determining whether a given plan is the best plan, the planner-scheduler can consider a variety of criteria, including but not limited to compliance with one or more defined constraints, compliance with relaxed constraints, minimum execution time, minimum resource expenditure, and the like. According to a related example, the current system state information may be received by the network-flow modeler 502 to provide online system information that permits the network-flow modeler 502 to continuously and/or periodically update a model of the system.

In this manner, when a machine model and/or a job description is received the planning framework 500 relaxes certain constraints to simplify the planning problem. Depending on the type of relaxation, the planning framework 500 then invokes an appropriate solver 504 to solve the simplified problem, and stores identified solutions in the precomputed plan database 506. In real time, when a job request is received, the planner-scheduler 508 can select a solution from the precomputed plan database 506 and quickly schedule it to ensure that at least one valid plan is available for execution. The planner 508 can then spend the remainder of an allocated planning time trying to find a better (e.g., faster, less expensive, etc.) solution than the initial solution.

Figure 6:
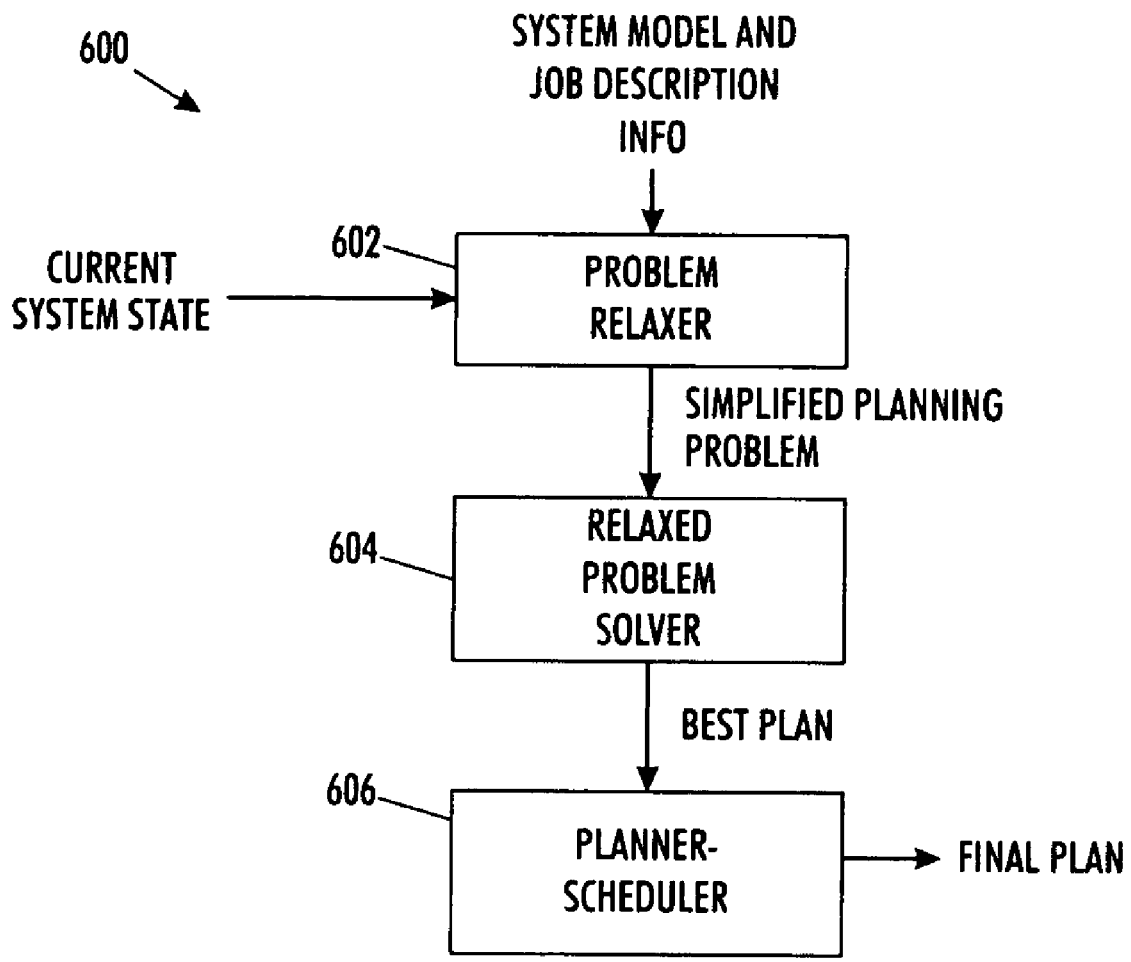
FIG. 6 illustrates a planning framework that employs a greedy search algorithm in conjunction with a constraint relaxing protocol to facilitate finding at least one valid job plan during a first portion of an allocated planning time period while conserving the remaining portion of the planning time period for generation and/or identification of an optimal job plan.

FIG. 6 illustrates a planning framework 600 that computes job plans online by employing a greedy search algorithm in conjunction with a constraint relaxing protocol to facilitate finding at least one valid job plan during a first portion of an allocated planning time period while conserving the remaining portion of the planning time period for generation and/or identification of an optimal job plan. The framework 600 comprises a problem relaxer 602 that receives system model and/or job description information. The problem relaxer 602 may additionally receive information related to a current state of the system, such as jobs to be performed, resource availability, system availability, and the like. Based on the received information, the problem relaxer 602 can employ the greedy search algorithm to relax and/or ignore one or more constraints on job performance in order to identify a set of events that will suffice to complete the job, which results in an increased number of potential job solutions. A simplified job planning problem (e.g., with the reduced constraints) can be output to a solver 604 that can identify one or more plans that satisfy the remaining constraints. A best plan returned by the solver 604 may be selected by a planner-scheduler 606 and output as a final plan. Thus, solver 604 may return an initial job solution that will permit job completing without necessarily complying with one or more constraints. Given that that relaxed problem solver 604 ignore some constraints to make the problem easier to solve, its solution may not be optimal according to all of the original constraints. A better plan (e.g., a plan that conforms to more or all of the original constraints) may be searched for and/or generated during a later portion of a predefined planning period.

Figure 7:
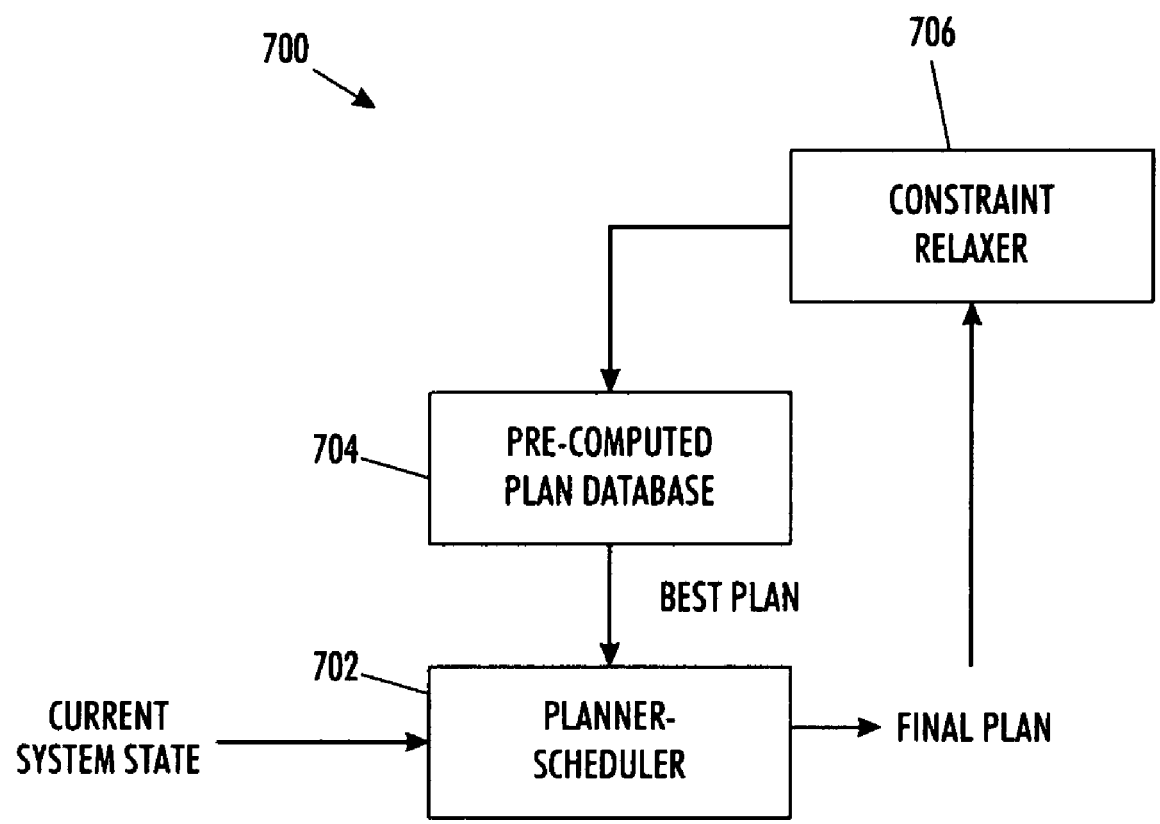
FIG. 7 is an illustration of a planning framework that employs another approach to job planning, wherein job solutions may be selected both from a set of precomputed job plans as well as previously performed job plans that are identified online in real time.

FIG. 7 is an illustration of a planning framework 700 that employs another approach to job planning, wherein job solutions may be selected both from a set of precomputed job plans as well as previously performed job plans that are identified online in real time, which may then be cached along with precomputed plans. For instance, the framework 700 can comprise a planner-scheduler 702 that receives current state information related to a state of a system for which a job is to be planned. The planner-scheduler 702 can additionally retrieve a best plan from a precomputed plan database 704, in which one or more plans for a job request, which have been precomputed during an offline period, may be stored. The "precomputed" plan selected by the planner-scheduler 702 is the plan that can complete the requested job with a minimum cost (e.g., of resources, time, etc.), as compared to other plans in the precomputed plan data base. Once the precomputed plan has been selected, the planner-scheduler can generate a final plan, which may comprise modifications to the retrieved precomputed plan, and which may be output for execution. The planner may also use the precomputed plan as an upper bound on the final plan quality and try to find a better plan in the remaining allotted planning time. If such a better plan is found, it is output as a final plan. The final plan may then be received by a constraint relaxer 706, which may evaluate the plan and, if the plan meets a predefined set of criteria, it may be stored in the precomputed plan database for future evaluation and/or selection by the planner-scheduler 702. In this manner, a final plan created online by the planner-scheduler 702 may become a precomputed plan for a subsequent call for job planning. Similarly, one or more of the precomputed plans stored in the precomputed plan database 704 may have been created by the planner-scheduler 702 during a previous planning procedure.

Figure 8:
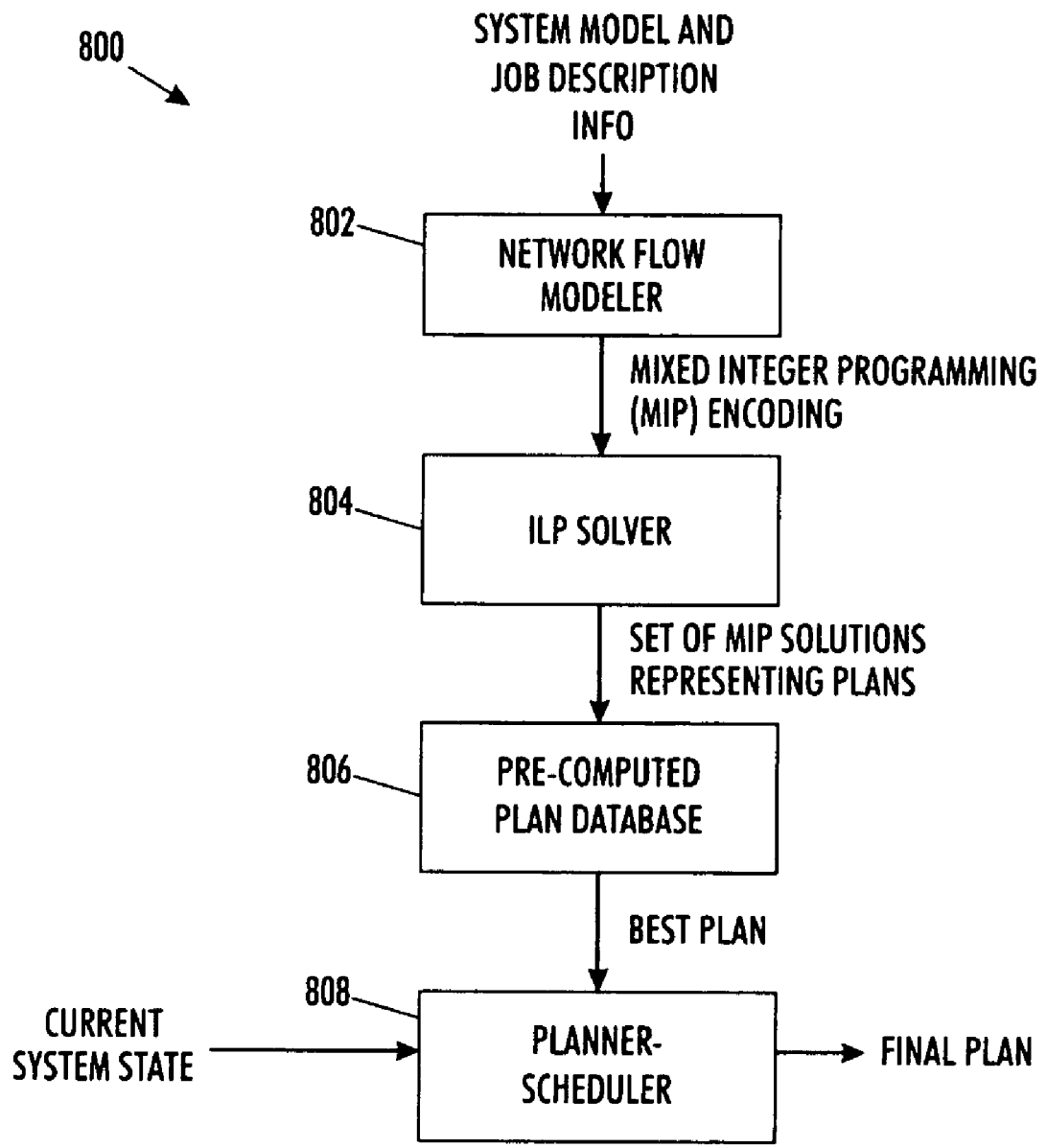
FIG. 8 illustrates a planning framework that facilitates simplifying a job plan procedure by employing an integer linear programming (ILP) technique, in accordance with one or more features.

FIG. 8 illustrates a planning framework 800 that facilitates simplifying a job plan procedure by employing a network-flow model to precompute one or more job plans, and a mixed integer programming (MIP) technique, in accordance with one or more features. The planning framework comprises a network flow modeler 802 that receives information associated with a model of a system for which a job is to be planned, as well as information associated with a description of the job to be planned. The network-flow modeler 802 may generate a model of the system using MIP encoding techniques, and may simplify the job planning problem to be solved by relaxing discrete relationships between objects to be processed during the job and by ignoring interaction between operations associated with different manufacturing requirements of the job. An MIP solver 804 (e.g., which may be a commercial MIP solver, a freeware solver, etc.) can solve the planning problem and provide a potential job solution. Multiple routes and/or plans that are encapsulated in a final solution for the network flow model may then be stored in a precomputed plan database 806. A planner-scheduler 808 can then receive information related to a good precomputed plan and system state information to generate a final plan.

Figure 9:
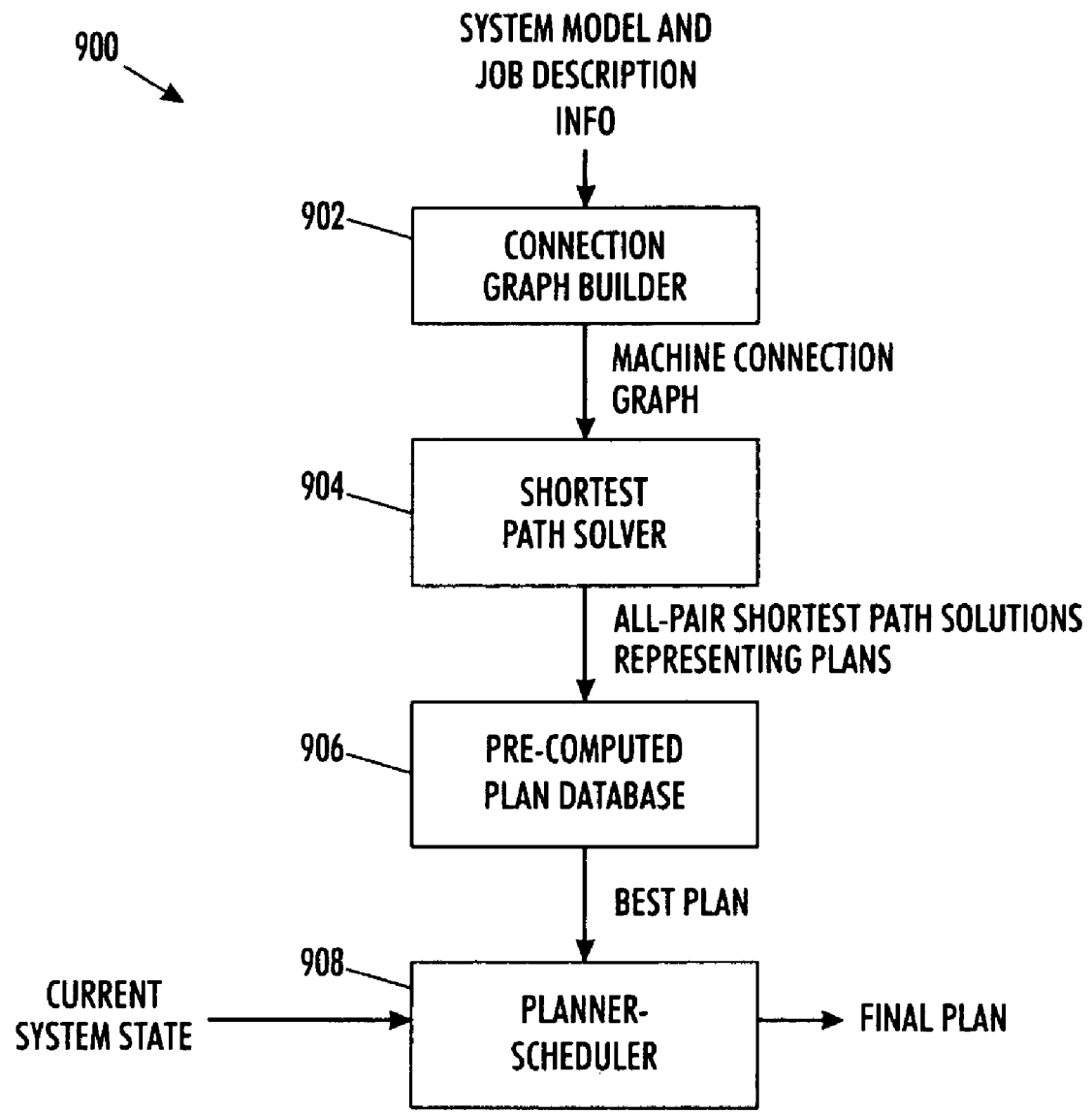
FIG. 9 is an illustration of a planning framework that facilitates generating and/or selecting a job plan solution using a connection graph, in accordance with various aspects.

FIG. 9 is an illustration of a planning framework 900 that facilitates generating and/or selecting a job plan solution using a connection graph, in accordance with various aspects. A connection graph builder 902 can receive information describing a system model and a job to be performed by the system. The connection graph builder 902 can generate a connection graph that describes connections between different components of the system used to route objects while ignoring the interactions between different operators associated with moving different objects. For instance, in a printing platform, objects may be pages that require processing or printing, and operators may comprise components that perform actions to process the pages, or the like. A shortest path solver 904 receives the connection graph and employs an all-pair shortest path searching algorithm to generate a set solutions, where each solution is representative of a plan for executing the requested job, and such plans may be stored in a precomputed plan database 906. A good precomputed plan may then be selected or retrieved by a planner-scheduler 908, which may further optimize the selected plan in accordance with current system state information in order to generate a final plan for execution. A final plan may then be output for execution. By ignoring only interactions between operators in the system model and accounting for object discreteness, the framework 900 may relax fewer constraints than other frameworks described herein, which may result in improved precomputed plan quality. The connection graph may be encoded (but not limited to) using a MIP technique and output a set of MIP encoded solutions.

Figure 10:
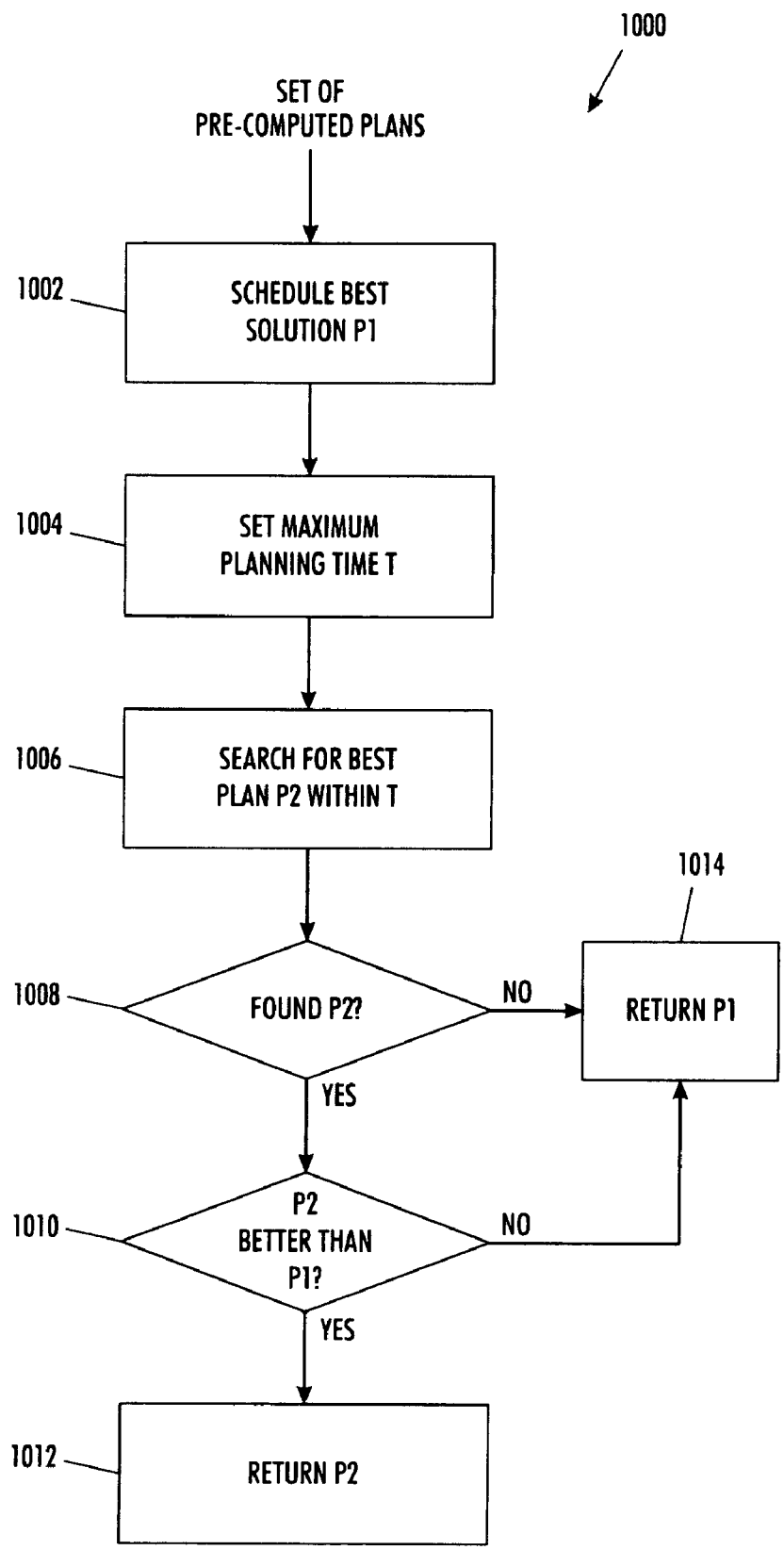
FIG. 10 is an illustration of a method for utilizing precomputed plans to plan a job in a predefined time period, where a sufficient job plan is identified during a first portion of the planning period, and a better job plan is searched for during a second portion of the planning period.

FIG. 10 is an illustration of a method 1000 for utilizing precomputed plans to plan a job in a predefined time period, where a sufficient job plan is identified during a first portion of the planning period, and a better job plan is searched for during a second portion of the planning period. A set of precomputed plans may be evaluated or otherwise received during the first portion of the planning period, and at 1002, a plan, P1, from among the precomputed plans may be identified as satisfying one or more criteria associated with the job to be performed, and scheduled for execution. For instance, when a manufacturing job is received, a planner may select a plan from a precomputed plan database and schedule it for execution. Thus, act 1002 can facilitate job planning while taking into account real-time resource constraints and the discreteness of materials being processed during execution of the manufacturing job. According to an example, the manufacturing job may be a printing job in a printer, and the materials may be sheets of paper. When scheduling an allocation of a resource, a new allocation may be scheduled after all other allocations of the same resource to resolve contention; therefore leading to a valid plan without searching. The selected or resulting plan P1 may then be used as an upper bound on the quality of a final plan to be searched for or found by the planner during the planning period.

At 1004, a maximum planning time, T, may be set to delineate a maximum allowable duration of the second portion of the planning period. At 1006, a search may be conducted for a second plan P2, which satisfies the predefined job criteria, and the search may be continued until the expiration of the period T (e.g., the second portion of the planning period). At 1008, a determination may be made regarding whether the second plan P2 has been identified. If not, then at 1014, plan P1 is returned to a planner or other system processor as the best-quality plan identified so far for execution.

If a second satisfactory plan is identified at 1008, then a determination may be made regarding whether plan P2 is better than plan P1, at 1010. Plan optimity may be determined as a function of one or more parameters associated with plan execution and/or performance. For example, parameters affecting optimity of the plan may include, without being limited to, plan execution speed, resource consumption, output quality, etc. In a specific example relating to a printer or xerographic machine, plan optimity may be a function of print job speed, cost savings associated with one or more resources (e.g., paper, toner, etc.), routing efficiency through the machine, etc. If P1 is determined to be better than P2, then the method may proceed to 1014, where P1 is output or returned to a processor and/or planner component for execution. If it is determined that P2 is better than P1, then P2 may be returned as a best-so-far solution for execution of the job or task, at 1012. It will be appreciated that when the cost of plan P1 is used as an upper bound in a branch-and-bound search, the discovery of plan P2 implies that P2 is better than P1. Thus, any further comparison between the costs of P1 and P2 is unnecessary.

It will be appreciated that the planning period may be on the order of seconds, milliseconds, microseconds, etc. in duration, and that the first and second portions of the planning period need not be of equal length. For example, the planning period may be in the range of approximately 100 ms to approximately 2 seconds, and the first and second portions thereof may exhibit approximately a 1:2 ratio in length. According to another example, if the total duration of the planning period is 300 ms, then the first portion thereof (e.g., corresponding to act 102) may have a duration of approximately 110 ms, and the remaining approximately 190 ms may be allocated for the second portion of the planning period (e.g., corresponding to acts 1004-1014). According to yet another example, the method is iterated multiple times within the planning time period to evaluate more than two plans and select a best plan for execution. It is to be understood that the foregoing examples are illustrative in nature and are not intended to limit the duration of the planning period, respective portions thereof, or the ratio of the duration of the first planning period portion to the second planning period portion.

Figure 11:
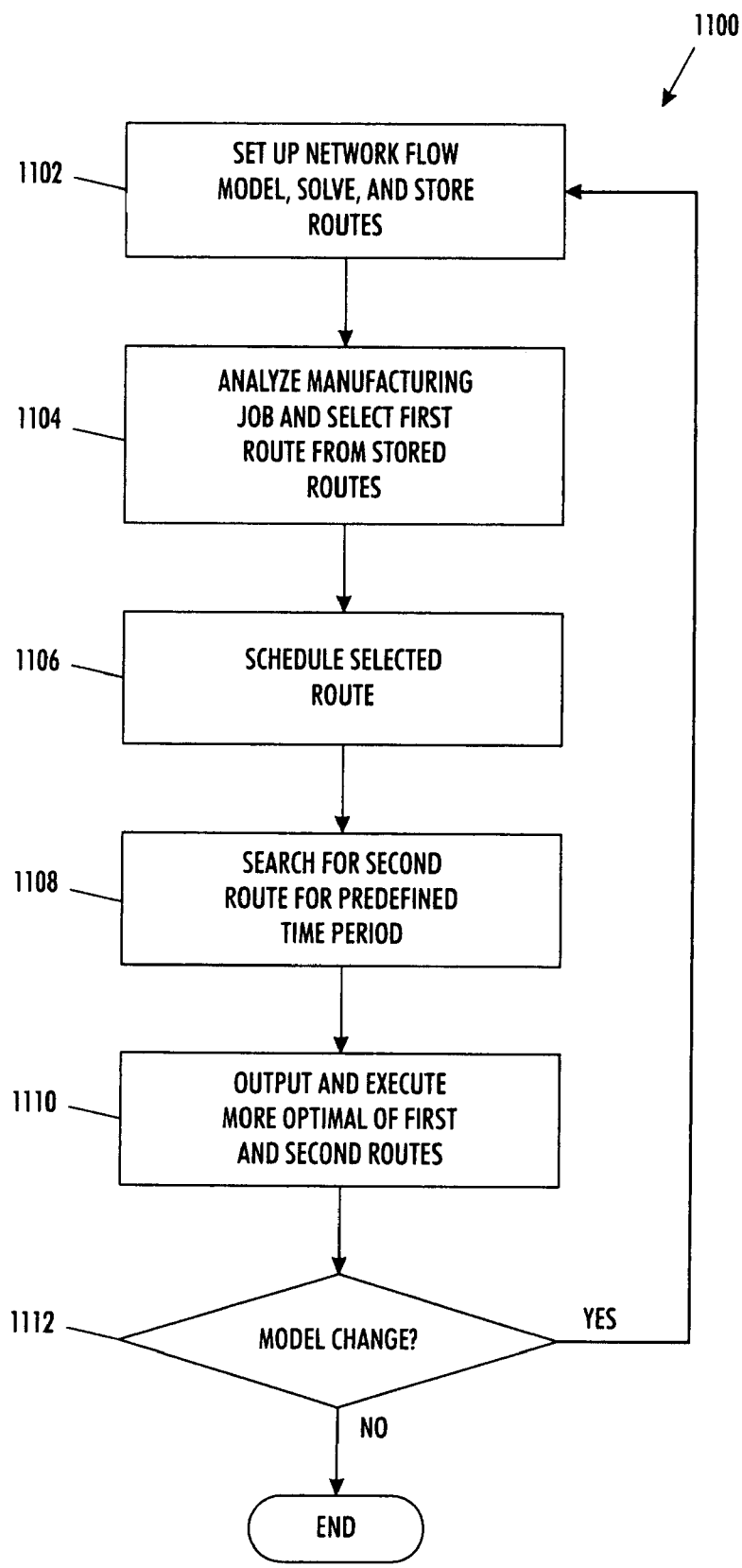
FIG. 11 illustrates a method for evaluating a print job that is to be performed by a print platform, selecting a first job plan that at least meets minimum criteria for performing the job to ensure that at least one plan is available, and then identifying a better plan for performing the job to improve job execution and performance, in accordance with various aspects such as bound on total time to search for a plan.

FIG. 11 illustrates a method 1100 for evaluating a print job that is to be performed by a print platform, selecting a first job plan that at least meets minimum criteria for performing the job to ensure that at least one plan is available, and identifying an optimal plan for performing the job to improve job execution and performance, in accordance with various aspects. The method 1100 may be performed by a planning component, such as the planner described with regard to the preceding figures. In the case of a print platform or other xerographic or imaging machine, the job plan may comprise determining one or more routes (e.g., through the printer) along which one or more pages may travel to be processed to ensure that the text on the page is properly printed, similarly for other automated manufacturing domains. At 1102, a machine model is evaluated, a network-flow model there for is generated and solved, and the possible routes encapsulated in the final solution of the network-flow model are stored. Act 1102 can be performed rapidly because the network-flow model relaxes discreteness and real-time constraints associated with job execution. At 1104, an incoming print job is detected and analyzed by a planner, which selects one of the routes precomputed by the network-flow model and tries to schedule it, at 1106. The selected plan is used as an upper-bound on the final plan to be found by the planner. A search is conducted at 1108, for a limited amount of time, for a better solution than the initial solution selected at 1104 from the network-flow solutions. If there is no better solution, the planner can output the initial plan selected from the network-flow solution, at 1110. If there is a better solution, then the plan associated with the better solution may be output at 1110. At 1112, a determination may be made as to whether the network-flow model has changed. Whenever there is a model change, such as a module in the model going off/on-line, then the method reverts to 1102 and a new network-flow model is built, solved again, and the new potential routes are stored in the database.

It will be noted that the final solution can go through the scheduling process at 1104 that takes into account the real-time resource constraints and the discreteness of the materials (e.g. sheets), even if it is not a valid plan when selected from the precomputed routes by the network-flow. "Network-flow" as described above (e.g. used as a solver in 1102) is one of several manners in which a set of relaxed solutions may be searched to quickly return one solution for online planning. The network-flow model need not take into account the discreteness of the materials and the online aspect of the system (e.g., ignoring the potential interaction with other pieces of materials moving in the plant). Another variation of this approach can comprise taking limited "online" information into account and set up a network-flow model at each stage when a new job comes in, as well as approximating the discreteness of the materials when solving the network-flow model. While the network-flow model is used in conjunction with various aspects described herein, other approaches such as "relaxed-plan" in academic planning research can be used as additional or alternative ways to precompute a set of candidate plans. For instance, the "relaxed-plan" approach works by relaxing logical interactions between actions/capability, but not the constraints on the discreteness of the materials as in the network-flow model. Moreover, a larger or smaller set of constraints can be relaxed when employing the presented network-flow model discussed above. Another approach is to use the all-pair shortest path algorithms to catch all possible routes upfront. This approach relaxes the interactions between different objects/sheets but take into account the discreteness of the objects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of planning a job in a machine environment, comprising:
   receiving a job to be planned;
   analyzing a set of precomputed plans to identify a first plan that is feasible;
   scheduling the first plan as a default plan;
   setting a maximum planning time period to identify a second plan;
   identifying the second plan if available; and
   determining whether the second plan is better than the first plan.

2. The method of claim 1, further comprising executing the first plan if the second plan is not available or if the second plan is not better than the first plan.

3. The method of claim 1, further comprising scheduling and executing the second plan if the second plan is better than the first plan.

4. The method of claim 1, further comprising determining the quality of the first plan and the second plan as a function of job execution time, wherein smaller execution time correlates to better quality.

5. The method of claim 4, iterated at least once to evaluate more than two plans within the maximum planning time period.

6. The method of claim 1, further comprising determining the quality of the first plan and the second plan as a function of a number of components involved in the execution of the job, wherein fewer components correlates to better quality.

7. The method of claim 1, further comprising receiving system model information, relaxing at least one constraint associated with the system model, and solving the relaxed system model to generate one or more precomputed plans.

8. The method of claim 7, wherein the at least one constraint is related to at least one of a predetermined maximum job execution time, a predetermined maximum number of components employed to complete the job, a discreteness of objects to be scheduled, the interactions between different activities of different objects, or an ordering of events occur during job execution.

9. A system for performing offline and online job planning for a machine job, comprising:
   a constraint library that stores at least one constraint that is employed to ensure that a given job plan conforms to a job request;
   a planner that analyzes a precomputed plan database and identifies a first plan to satisfy the job request during a first portion of a predefined planning period, and attempts to identify a second plan during a second portion of the predefined planning period; and
   an optimizer that compares the first plan and the second plan to determine which plan is better for executing the job request;
   wherein the first portion of the predefined planning period is approximately one-third of the total predefined planning period, and wherein the second portion of the predefined planning period is the other approximately two-thirds of the predefined planning period.

10. The system of claim 9, wherein the planner schedules the first plan if the second plan is not identified.

11. The method of claim 9, iterated at least once to evaluate at least a third plan within the given length of time.

12. The system of claim 9, wherein the planner schedules the better of the first and second plans upon an indication thereof from the optimizer.

13. The system of claim 9, further comprising a constraint relaxer that relaxes one or more constraints to increase a number of plans identified as satisfying the job request.

14. The system of claim 9, further comprising a constraint relaxer that removes one or more constraints to facilitate finding a plan using a smaller set of constraints.

15. The system of claim 9, wherein the predefined planning period is less than approximately 1 second in duration.

16. The system of claim 9, wherein the predefined planning period is approximately 0.2 seconds to approximately 0.5 seconds in duration.

17. The system of claim 9, wherein the job is a print job and the machine comprises a print platform.

18. The system of claim 9, wherein the at least one constraint relates to a maximum allowable job execution time period.

19. The system of claim 9, wherein the at least one constraint relates to a maximum allowable number of components employed to execute the job.

20. The system of claim 9, wherein the at least one constraint relates to interferences between different operators in the system.

21. The system of claim 9, wherein the at least one constraint relates to interferences between different objects moving in the system.

22. A system comprising:
   one or more components that execute instructions for performing a process;
   a planner that receives a job request, analyzes a set of precomputed job plans to identify a first plan that satisfies one or more job performance-related constraints during a first portion of a planning period, and identifies at least a second plan that satisfies the one or more job performance-related constraints during a second portion of the planning period;
   an optimizer that compares the first and the at least second plan, if such is found, to determine which plan is better;
   wherein the planner schedules the first plan for execution upon identifying the first plan, and schedules the at least second plan in place of the first plan if the at least second plan is determined to be better than the first plan.

23. The system of claim 22, wherein the components are xerographic components for performing a xerographic process.

24. The system of claim 23, wherein the xerographic components are part of a tightly-integrated parallel printing platform.

* * * * *

UNITED STATES PATENT AND TRADEMARK OFFICE
CERTIFICATE OF CORRECTION

| | | |
|---|---|---|
| PATENT NO. | : 7,925,366 B2 | Page 1 of 1 |
| APPLICATION NO. | : 11/807475 | |
| DATED | : April 12, 2011 | |
| INVENTOR(S) | : Wheeler Ruml et al. | |

It is certified that error appears in the above-identified patent and that said Letters Patent is hereby corrected as shown below:

Title Page

Item (73) should read:

Assignee: Palo Alto Research Center Incorporated, Palo Alto, CA (US)

Signed and Sealed this
Twenty-sixth Day of July, 2011

David J. Kappos
*Director of the United States Patent and Trademark Office*